United States Patent
Schreiber

(10) Patent No.: US 7,324,359 B2
(45) Date of Patent: Jan. 29, 2008

(54) CIRCUIT FOR CONVERTING ALTERNATING VOLTAGE INTO HIGH-VOLTAGE DIRECT VOLTAGE

(75) Inventor: Dejan Schreiber, Nürnberg (DE)

(73) Assignee: Semikron Elektronik GmbH & Co., KG, Nürnberg (DE)

( * ) Notice: Subject to any disclaimer, the term of this patent is extended or adjusted under 35 U.S.C. 154(b) by 334 days.

(21) Appl. No.: 11/032,380

(22) Filed: Jan. 10, 2005

(65) Prior Publication Data
US 2005/0151520 A1 Jul. 14, 2005

(30) Foreign Application Priority Data
Jan. 9, 2004 (DE) .................. 10 2004 001 478

(51) Int. Cl.
*G05F 1/70* (2006.01)
(52) U.S. Cl. ........................................ 363/68
(58) Field of Classification Search ............ 363/65, 363/67, 68, 71; 323/205, 207
See application file for complete search history.

(56) References Cited

U.S. PATENT DOCUMENTS

| | | | |
|---|---|---|---|
| 4,725,938 A * | 2/1988 | Onodera ..................... 363/28 |
| 5,625,545 A | 4/1997 | Hammond | |
| 5,687,071 A * | 11/1997 | Debruyne et al. .......... 363/127 |
| 6,847,531 B2 * | 1/2005 | Bixel ........................... 363/71 |
| 7,148,661 B2 * | 12/2006 | Trainer et al. .............. 323/207 |

* cited by examiner

*Primary Examiner*—Adolf Berhane
(74) *Attorney, Agent, or Firm*—Cohen Pontani Lieberman & Pavane LLP

(57) ABSTRACT

A converter circuit for a wind power system for supplying a high-voltage direct voltage connection. The system includes a transformer with one primary winding per phase and a plurality of secondary windings per phase. Three of these secondary windings of different phase are connected to each rectifier cell. These rectifier cells are connected to one another by their inputs and outputs. The rectifier cells themselves each include one input rectifier and two series-connected upward converters, and the center tap of the secondary winding of the transformer is connected to the center points of the series circuit of the upward converters.

7 Claims, 4 Drawing Sheets

CIRCUIT FOR CONVERTING ALTERNATING VOLTAGE INTO HIGH-VOLTAGE DIRECT VOLTAGE

BACKGROUND OF THE INVENTION

1. Field of the Invention

The invention is directed to a circuit for converting a medium amplitude voltage from a three-phase generator into a high-voltage direct voltage to convert the output of a generator whose output power varies dynamically to a high-voltage direct voltage connection to an inverter. Such dynamically varying output power occurs for instance in wind power systems. When a plurality of wind power systems are put together to make what is known as a wind farm, the individual wind power systems in the prior art are connected by a common inverter, which serves to feed current into a current system, to a high-voltage direct voltage connection.

2. Description of the Related Art

In the prior art, generators of the medium-voltage class are preferably used to generate current. The three phases of the outputs of these generators are connected to a transformer, which converts the medium voltage into high voltage on the order of magnitude of 100,000 volts. The alternating voltage generated is then rectified by means of a high-voltage diode rectifier and fed into the high-voltage direct voltage connection.

SUMMARY OF THE INVENTION

A further, very modern, design for generators and a general description of the aforementioned arrangement of wind power systems was for instance presented by F. Owman at the conference "Wind Power 2001" in June in Washington, D.C. The generators presented there directly generate a high-voltage alternating voltage, and therefore a downstream transformer for producing alternating voltage is unnecessary.

A disadvantage of the prior art described is that the output voltages of the various wind power systems are intrinsically not identical, since even within one wind farm, at least slightly different wind speeds prevail at different places, and thus the rotary speeds of all the rotors and hence the speed of rotation of all the generators are not identical. As a consequence, the voltages generated for feeding into the high-voltage direct voltage connection are not identical, either. To make it possible to compensate for at least slightly different rotary speeds, synchronous machines are preferably used as generators, since these synchronous machines are externally excited. Suitable adaptation of the excitation of each generator makes it possible to adapt their speeds of rotation to one another. It is thus possible to keep the output voltages of all the wind power systems of the same wind park constant, and thus, for the first time, to make the high-voltage direct voltage connection, but the efficiency of the wind power system is lessened. However, it is not possible to use permanently excited generators here, since the influence on their rotary speed by the external excitation is lacking.

Another disadvantage of the prior art described is that in contrast to the locally differing wind speeds in a wind farm, the varying wind speeds over time intrinsically fluctuate substantially more markedly. A complete compensation for these fluctuations, which leads to a constant voltage over time of the high-voltage direct voltage connection is possible to only a limited extent.

Major fluctuations in the wind speed thus necessarily lead to a voltage of the high-voltage direct voltage connection that varies over time. The inverter supplied from the high-voltage direct voltage connection is designed for a certain voltage of this high-voltage direct voltage connection. If this set-point voltage is equivalent to the maximum voltage of the high-voltage direct voltage connection, then the result very effectively feeds into the current system for precisely that voltage. However, in that case, the feeding into the system would no longer be possible at markedly lower wind speeds and the attendant markedly lower voltage values in the high-voltage direct voltage connection. The inverter in the prior art is therefore designed for a voltage that is less than the maximum voltage of the high-voltage direct voltage connection, for instance half the maximum voltage. In that design, on the other hand, even at maximum voltage in the high-voltage direct voltage connection, the power output into the system is intended to attain the same value as in the aforementioned design for this maximum voltage. Hence the inverter designed for a lesser voltage must be made oversized, in comparison with an inverter dimensioned for the maximum value. Therefore, because of the different voltage values in the high-voltage direct voltage connection, optimal dimensioning of the inverter for a plurality of operating states (i.e., for different wind speeds) is not possible.

Another disadvantage of the prior art discussed is that because of the high-voltage diode rectifier, the generator current is not sinusoidal, and therefore, for a given rpm, the generator cannot output its maximum power, which again leads to reduced efficiency of the wind power system.

On the other hand, a cascaded arrangement of identical cells of a certain functionality is known in the prior art, for instance in U.S. Pat. No. 5,625,545. This reference describes a two-quadrant AC-AC drive for alternating current motors. It uses a transformer with a plurality of secondary windings. These secondary windings supply cascaded cells with a single-phase alternating voltage output. This series circuit of the individual cells serves to multiply the voltage in a branch.

The object of the present invention is to present a converter circuit for converting an alternating voltage into a high-voltage direct voltage, which makes possible the use of a plurality of versions of generators, generates a constant high-voltage direct voltage that is independent on the generator rpm, and that generates approximately sinusoidal generator currents.

A converter circuit for converting a multi-phase, and preferably three-phase, generator voltage, preferably in the medium-voltage range into a high-voltage direct voltage of the inventive type comprises the following essential components: a transformer, and a plurality of rectifier cells. The transformer comprises at least one primary winding per phase and a plurality of secondary windings per phase. Three of these secondary windings of different phase are connected to each rectifier cell. The inputs and outputs of these rectifier cells are connected to one another in such a way that the output of one cell is connected to the input of the next cell, resulting in a cascaded series circuit. The transformer can also be dispensed with here, if instead of the medium-voltage generator, a high voltage generator is used, which makes the requisite voltage available directly at its outputs.

A rectifier cell according to the invention in turn comprises one input rectifier and two series-connected upward converters, and the center tap of the secondary winding of the transformer is connected to the center points of the series circuit of the upward converters.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

The inventive concept will now be described in terms of examples in conjunction with FIGS. 1 through 4.

DETAILED DESCRIPTION OF THE PRESENTLY PREFERRED EMBODIMENTS

Figure 1:
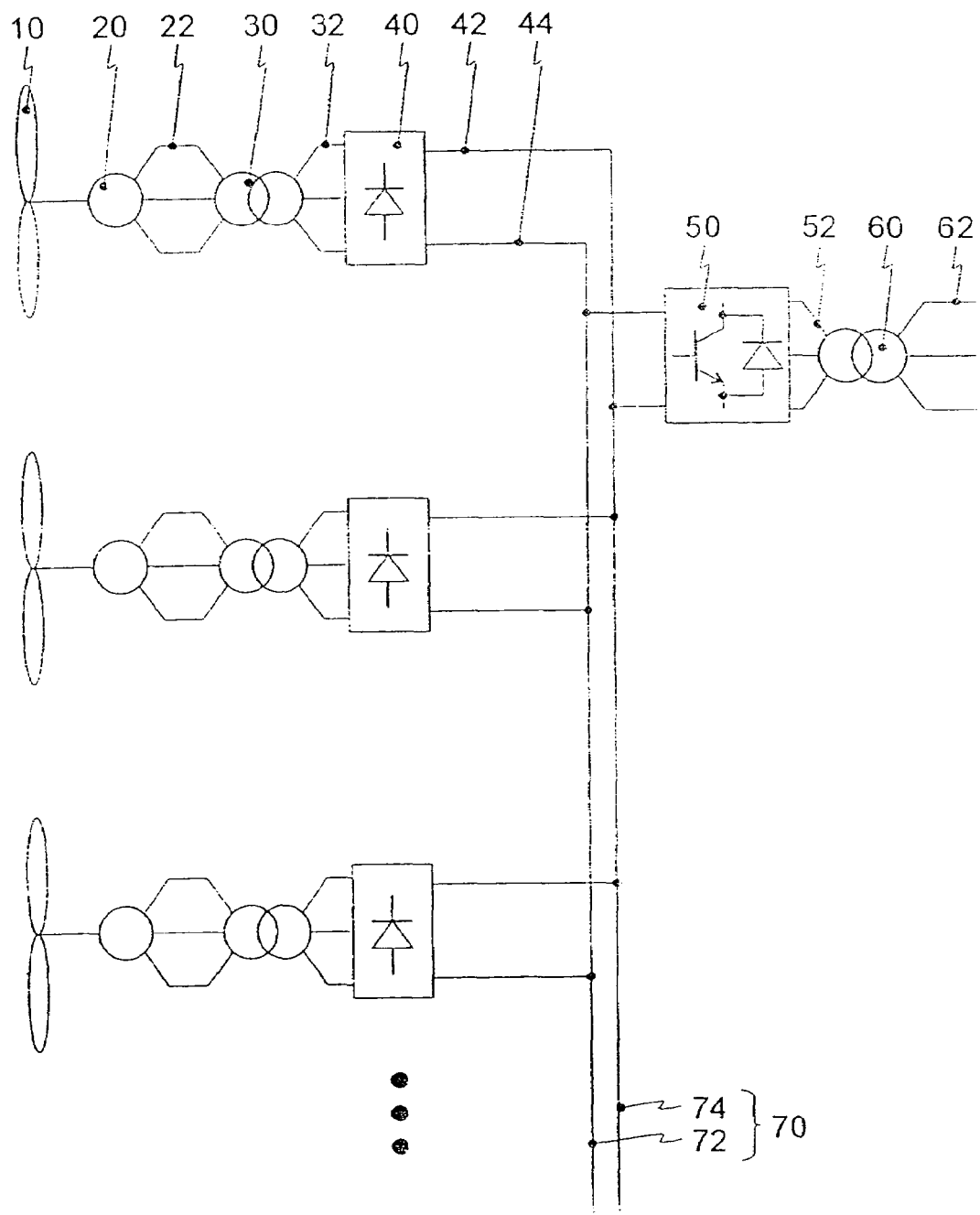
FIG. 1 shows a converter circuit for generating a system voltage from a plurality of generator outputs, connected via a high-voltage direct voltage connection, according to the prior art.

FIG. 1 shows a circuit for feeding the energy generated in a wind farm into a current system 62, comprising a plurality of generator outputs 22 of individual wind power systems, according to the prior art. Outputs 22 are connected via a high-voltage direct voltage connection 70. Each wind power system has a generator 20, connected to the rotor 10 either by means of a gear or directly. In the prior art, this is preferably an externally excited medium-voltage synchronous generator, for instance of the 3×4.18 kV voltage class. Outputs 22 of the generator 20 are connected to a transformer 30, and its outputs 32 in turn are connected to a high-voltage diode rectifier 40. This combination of a transformer 30 and a high-voltage diode rectifier 40, in the two lines 72, 74 of the high-voltage direct voltage connection 70, generates a direct voltage of 2×140 kV, and their null point is grounded.

Outputs 42, 44 of high-voltage diode rectifier 40 are connected in parallel and form the source of high-voltage direct voltage connection 70. By means of high-voltage direct voltage connection 70, the energy of the wind power systems is transmitted over a distance of several kilometers, for instance in the offshore area, to an inverter 50 that is common to all the wind power systems. This inverter 50 is connected by a further transformer 60 to the current system 62 to be supplied.

Figure 2:
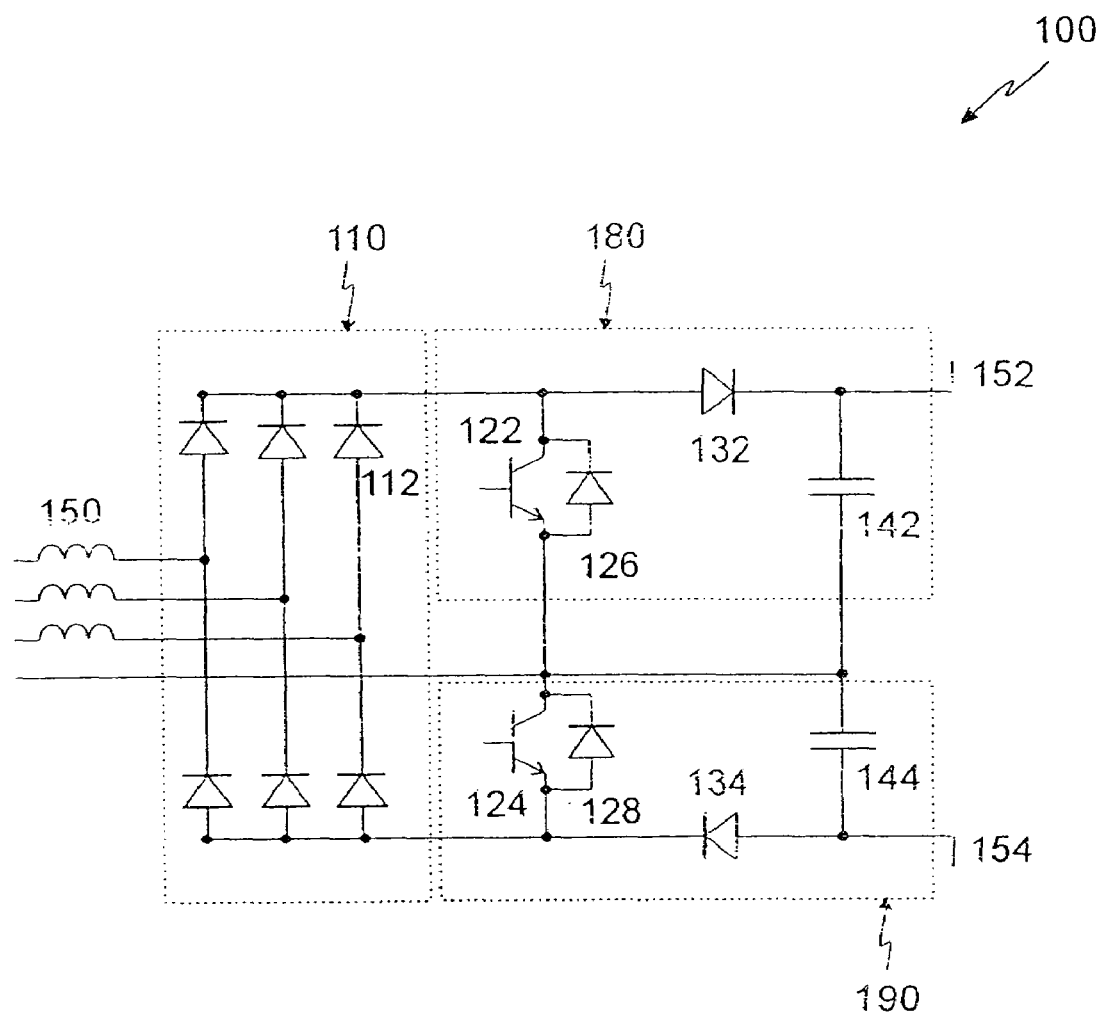
FIG. 2 shows an embodiment of a rectifier cell of a converter circuit arrangement according to the invention.

FIG. 2 shows an embodiment of a rectifier cell 100 of a converter circuit according to the invention. It comprises three input phases, in each of which one coil 150 is disposed. These three input phases of the input alternating voltage are converted into a direct voltage in a downstream three-phase bridge rectifier 110. A series circuit comprising two power semiconductor switches 122, 124, in this case two IGBTs (Insulated Gate Bipolar Transistors), each with one antiparallel-connected diode 126, 128, respectively, is connected between the two outputs of the bridge rectifier. The positive output of the bridge rectifier is also connected to the anode of an output diode 132, whose cathode forms the output 152 of the rectifier cell 100.

The negative output of the bridge rectifier is connected to the cathode of a further diode 134, the input diode, whose anode forms the input 154 of the rectifier cell 100. A series arrangement of two capacitors 142, 144 is also connected between the input 154 and the output 152 of the rectifier cell 100.

The center tap of the three input phases is connected to the center point of the two series-connected power semiconductor switches 122, 124 and to the center point of the two series-connected capacitors 142, 144.

This arrangement of the power semiconductor switches 122, 124, the diodes 126, 128 connected parallel thereto, input diode 154 and output diode 152, the capacitors 142, 144, and the coils 150 forms two series-connected upward converters. The coils 150 may, as shown, be disposed in the alternating voltage inputs of the diode rectifier. Alternatively, a first coil of the first upward converter 180 may be disposed between the positive output of the input rectifier 110 and the collector of the first power semiconductor switch 122, and the second coil of the second upward converter 190 may be disposed between the negative output of the input rectifier 110 and the emitter of the second power semiconductor switch 124.

As the power semiconductor switches 122, 124, IGCTs (Insulated Gate Commutated Thyristors), for example, or preferably IGBTs (Insulated Gate Bipolar Transistors) as known in the prior art may be used. Using IGBTs with a rated voltage of 1700 V would, because of their series circuit 122, 124 and the known rules of dimensioning, allow a direct voltage of more than 2400 V between the input 154 and the output 152 of the rectifier cell 100.

The decisive functionality of the rectifier cell 100 of the invention resides in the action of the upward converters 180, 190. As a result of the proposed disposition of these upward converters, a constant high direct voltage between the input 154 and the output 152 of the rectifier cell 100 can be generated even when there is a varying input voltage and hence a varying direct voltage at the output of the rectifier 110.

Figure 3:
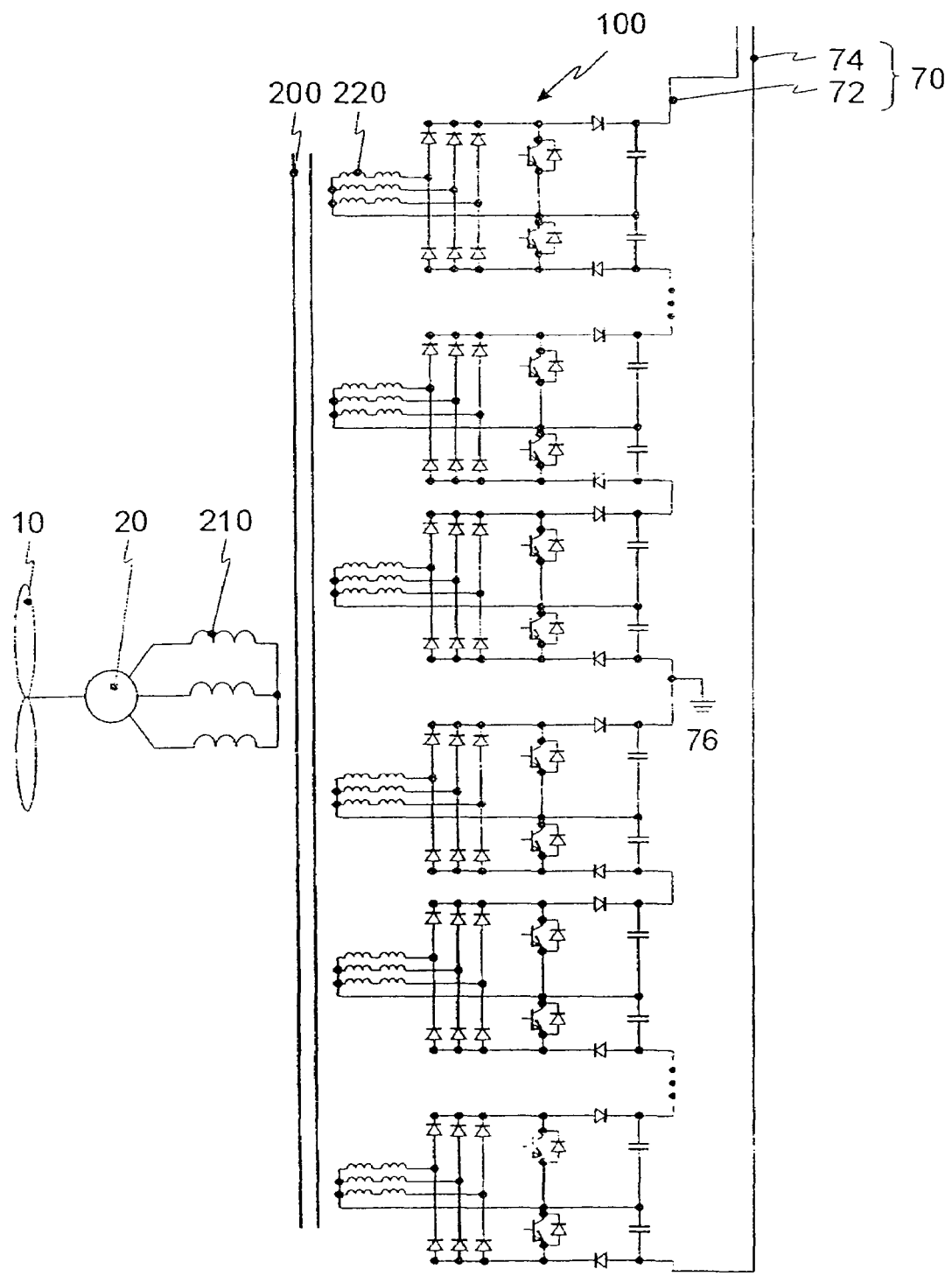
FIG. 3 shows an embodiment of a converter circuit according to the invention.

FIG. 3 shows one embodiment of a converter circuit according to the invention. The drawing shows a wind power system with a rotor 10, which drives a generator 20, in this case as an example a permanent magnet synchronous generator of the 3×6.3 kV voltage class. Other types of rotary current machines, such as externally excited synchronous machines, may also be used as generators 20.

Generator 20 generates three-phase alternating current, which in its course over time varies not only in voltage, but also in its current intensity and frequency. The voltage generated in the three phases is applied in each case to a primary winding 210 of a transformer 200. On the secondary side, transformer 200 has a plurality of secondary windings 220 per phase. Each three secondary windings 220 of different phase form the input alternating voltage of the rectifier cells 100.

These rectifier cells 100 are connected in series such that the input 154 of each rectifier cell 100 is connected to the output 152 of the next rectifier cell 100. The center point of this series circuit is at ground potential 74, in order to generate an output voltage of 2×140 kV. Depending on the voltage classes of the capacitors 140 and the power semiconductor components, that is, the power semiconductor switches 122, 124 and the diodes 112, 126, 132, 134, a plurality of rectifier cells 100 is disposed in series to generate the target voltage.

By means of this converter circuit according to the invention, the voltage of the high-voltage direct voltage connection 70 can be kept constant over a range of from one-tenth the output voltage to the full output voltage of the generators 20. Thus the energy generated from the essential components of the incident wind speeds at the individual wind power systems in a wind park can be fed into a current system by means of an inverter downstream of the high-voltage direct voltage connection 70.

Figure 4:
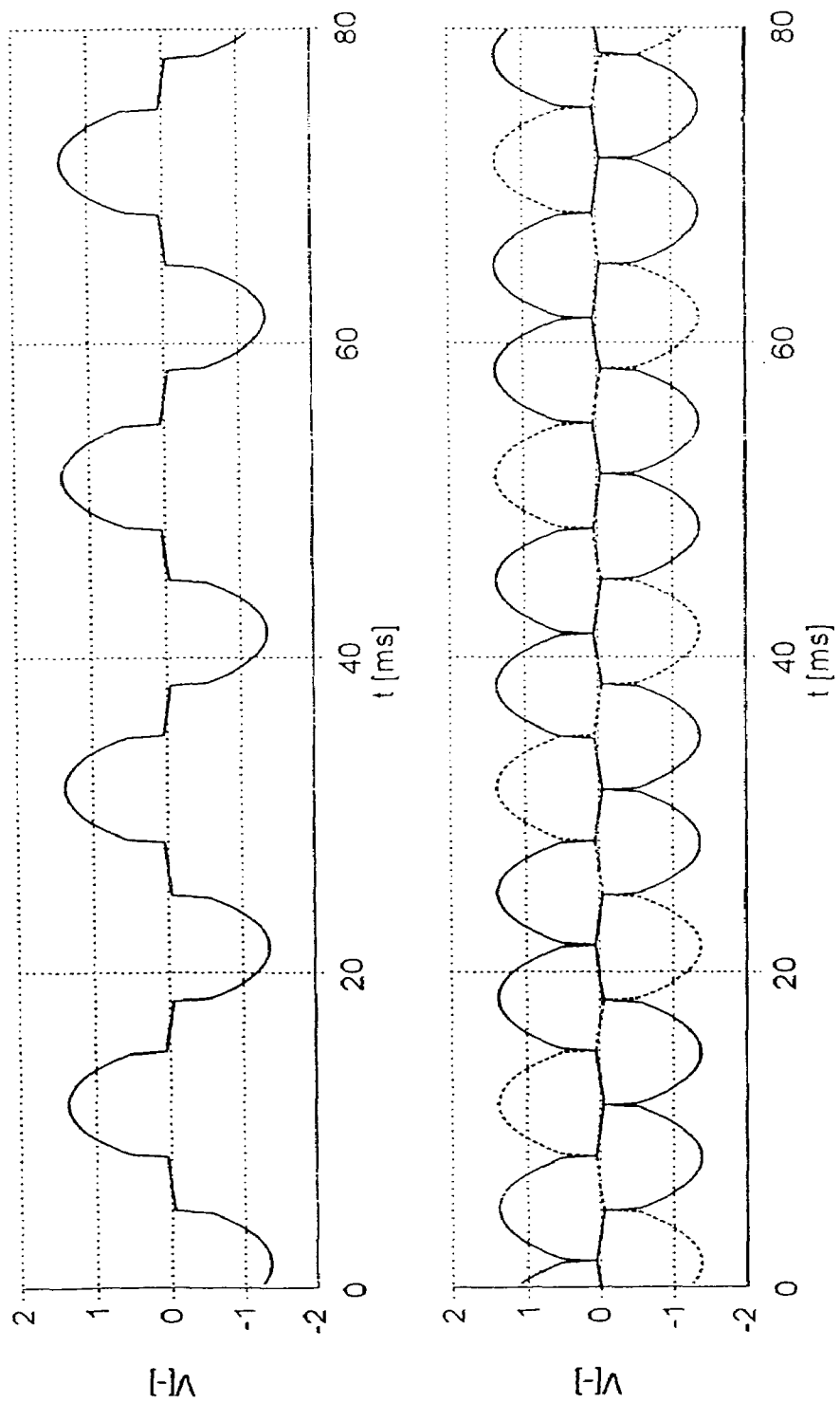
FIG. 4, in a simulation, shows the direct voltage of one and three phases generated by a converter circuit according to the invention.

FIG. 4, in a simulation, shows the generator voltage generated by a converter circuit of the invention, in arbitrary units of one or three phases. The course of the voltage over time in one phase of the generator is shown in the upper part of FIG. 4, and the course of the voltage of all three phases of the generator is shown in the lower part. With the exception of the zero crossovers, this course over time is adapted by the invention converter circuit to a desirable sinusoidal waveform. Only if the generator voltage course is approximately sinusoidal can the generator output its maximum power. The efficiency of the wind power systems can thus be increased by the converter circuit arrangement presented.

By means of the converter circuit arrangement of the invention, the torque of the generator can be regulated and adapted, so that over a wide range of different wind speeds, the maximum power of the generator is always available. In comparison to the prior art, this increases the efficiency of a wind power system by at least 10%.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A converter circuit for converting a multi-phase generator voltage into a high-voltage direct voltage, comprising:
    at least one rectifier cell having an input rectifier and two series-connected upward converters; and
    a transformer having at least one primary winding per phase and a plurality of secondary windings per phase, wherein the secondary windings of different phases are each connected to one rectifier cell and said rectifier cells are connected to one another by their inputs and outputs; and
    wherein the center tap of said secondary windings of said transformer is connected to the point between said two series connected upward converters.

2. The converter circuit of claim 1, wherein said input rectifier is a three-phase diode rectifier.

3. The converter circuit of claim 1, wherein each upward converter includes a power semiconductor switch, having a diode, connected antiparallel to said power semiconductor switch, a capacitor in parallel to said power semiconductor switch, a diode connected between one end of said capacitor and one end of said power semiconductor switch, and at least one coil.

4. The converter circuit of claim 1, wherein the series circuit of said upward converters includes first and second power semiconductor switches, each with a diode, each of said diodes being connected antiparallel to a respective one of said power semiconductor switches, at least two coils, a plurality of capacitors connected in series and one diode each at the input and at the output of said rectifier cell;
    wherein the collector of said first power semiconductor switch is connected to the positive output of said input rectifier, and the emitter of said second power semiconductor switch is connected to the negative output of said input rectifier;
    wherein the anode of said output diode is connected to the collector of said first power semiconductor switch and to the positive output of said input rectifier; the cathode thereof is connected to a first of said plurality of capacitors and to the output of said rectifier cell; the cathode of said input diode is connected to the emitter of said second power semiconductor switch and to the negative output of said input rectifier; and the anode therefor is connected to a second capacitor of said plurality of capacitors and to the input of said rectifier cell; and
    wherein the center tap of said secondary winding of said transformer is connected to the center point of the series circuit of the power semiconductor switches and to the center point of the series circuit of said plurality of capacitors.

5. The converter circuit of claim 1, wherein the coil of the first upward converter is disposed between the positive output of the input rectifier and the collector of the first power semiconductor switch, and the coil of the second upward converter is disposed between the negative output of the input rectifier and the emitter of the second power semiconductor switch.

6. The converter circuit arrangement of claim 1, wherein the coils of the upward converters are disposed in the alternating voltage inputs of the rectifier.

7. The converter circuit arrangement of claim 1, wherein the power semiconductor switches selected from the group consisting of are IGBTs (Insulated Gate Bipolar Transistors) and IGCTs (Insulated Gate Commutated Thyristors).

* * * * *